US007689300B2

(12) United States Patent
Naganawa et al.

(10) Patent No.: US 7,689,300 B2
(45) Date of Patent: Mar. 30, 2010

(54) NUMERICAL CONTROL UNIT (75) Inventors: Yuji Naganawa, Aichi (JP); Yasushi Fukaya, Aichi (JP); Yoshiichi Ichikawa, Aichi (JP); Mamoru Yamashita, Aichi (JP)

(73) Assignee: Okuma Corporation, Aichi (JP)

( * ) Notice: Subject to any disclaimer, the term of this patent is extended or adjusted under 35 U.S.C. 154(b) by 404 days.

(21) Appl. No.: 11/205,228

(22) Filed: Aug. 16, 2005

(65) Prior Publication Data

US 2006/0041325 A1    Feb. 23, 2006

(30) Foreign Application Priority Data

Aug. 20, 2004   (JP) .............. 2004-241363

(51) Int. Cl.
G05B 19/18 (2006.01)
G05B 11/32 (2006.01)
G05B 15/00 (2006.01)
G05F 19/00 (2006.01)

(52) U.S. Cl. .................. 700/61; 700/186; 700/63; 700/69; 700/76; 700/160

(58) Field of Classification Search .......... 700/61, 700/63, 76, 69, 160, 186
See application file for complete search history.

(56) References Cited

U.S. PATENT DOCUMENTS 4,131,836 A   12/1978   Noda 4,442,493 A * 4/1984 Wakai et al. ............... 700/177
4,489,377 A   12/1984 Mawyer et al.

(Continued)

FOREIGN PATENT DOCUMENTS

| JP | 60160407 | 8/1985 |
|---|---|---|
| JP | 63236106 | 10/1988 |
| JP | 06328386 A | * 11/1994 |

(Continued)

OTHER PUBLICATIONS

An Office Action issued on Jun. 4, 2008 from the German Patent Office for a corresponding German Patent Application No. 10 2005 037 779.3, with English translation.

(Continued)

Primary Examiner—Albert DeCady
Assistant Examiner—Tejal Gami
(74) Attorney, Agent, or Firm—Gauthier & Connors LLP (57) ABSTRACT

When causing manual movement of a moving section of a machine tool, shape data of the moving section is made to move in a movement direction that has been input manually, and it is confirmed whether there is no interference with shape data of a surrounding interfering object. If interference occurs, a position returned a specified distance from the position where interference occurs is made a stop position, the moving section is moved to this stop position, and stopped at that position.

2 Claims, 5 Drawing Sheets

U.S. PATENT DOCUMENTS

| | | | | |
|---|---|---|---|---|
| 4,513,366 | A | * | 4/1985 | Munekata et al. ............ 700/178 |
| 4,720,796 | A | * | 1/1988 | Kishi et al. ................. 700/178 |
| 5,815,400 | A | * | 9/1998 | Hirai et al. .................. 700/173 |
| 6,269,283 | B1 | * | 7/2001 | Shinozaki et al. ........... 700/172 |
| 6,535,788 | B1 | | 3/2003 | Yoshida et al. |
| 6,632,053 | B2 | * | 10/2003 | Koch ........................... 409/132 |

FOREIGN PATENT DOCUMENTS

| | | | |
|---|---|---|---|
| JP | 08047841 | A * | 2/1996 |
| JP | 8263116 | | 10/1996 |
| JP | 2000084794 | | 3/2000 |
| JP | 2001315087 | | 11/2001 |
| JP | 2005092654 | | 4/2005 |

OTHER PUBLICATIONS

Office Action issued on Oct. 28, 2008 from the Japanese Patent Office for corresponding Japanese Patent Application No. 2004-241363, with English translation.

Office Action issued on Mar. 24, 2009 from the Japanese Patent Office in corresponding Japanese Patent Application Serial No. 2004-241363 along with an English translation.

* cited by examiner

NUMERICAL CONTROL UNIT

CROSS-REFERENCE TO RELATED APPLICATION

The entire disclosure of Japanese Application No. 2004-241363 including specification, claims, drawings and abstract is incorporated herein by reference.

BACKGROUND OF THE INVENTION

1. Field of the Invention

The present invention relates to a numerical control unit for controlling axial movement of a moving section of a machine tool in response to manual axial movement operations.

2. Description of the Related Art

With a well known numerical control unit, if an axial movement operation is performed manually function generation is carried out for each axial control period corresponding to the movement direction, to achieve axial movement control of a moving section of a machine tool. Conventionally, in order to avoid mechanical collisions in a manual axial movement operation, a range in which movement is possible is registered in advance, and when this range is deviated from, control is executed so that a moving section is decelerated and stopped at the boundary of this range.

With a conventional method for preventing collision in manual operation, it is standard for a range in which movement is possible for each control axis to be stored in advance, and there is a problem that it is necessary to avoid collisions of interfering objects that are within the range in which movement is possible for each control axis, such as workpiece, a jig, a tailstock, etc. by an operator taking care in operations.

Also, as a method for automatically avoiding interference between a tool and workpiece using a manual operation, Japanese patent Laid-open No. 2000-84794 discloses a method of adding means for predicting interference. Means for predicting interference added to an external section confirms whether or not there is interference between a tool and workpiece resulting from a manual operation by the operator, and if it is determined that there will be interference an axial stop instruction to be sent to the numerical control device is issued. However, when only a stop command is issued unidirectionally towards the numerical control unit, axial movement is started or restarted very finely while confirming whether or not there is interference, for an axial movement instruction manually by an operator, movement is very fine in order to avoid interference, and it is not possible to decelerate and stop accurately at a desired position.

SUMMARY OF THE INVENTION

The present invention is advantageous in preventing interference of a moving section at the time of manual operation.

The present invention provides a numerical control device for causing movement of a moving section of a machine tool, comprising an operation input device for performing movement operations for the moving section manually, a memory for storing shape data of the moving section and shape data of an interfering object, that is capable of interfering with the moving section, an interference check section for confirming whether or not shape data for the moving section will interfere with shape data for the interfering object by moving in a movement direction input using the operation input device, and if there will be interference, calculating a stop position separated only a predetermined distance from an interference position in a direction opposite to the movement direction, and a function generator section for generating a function, for controlling axial movement of the moving section, based on a movement operation input from the operation input device, and, in the event that it has been determined by the interference check section that there is interference, generating a function to stop the movement section at the stop position.

Also, if movement direction of a manual axial movement operation is two axes or more, the interference check section, in the event that it is determined that there will be interference between shape data of the moving section and shape data of the interfering object, confirms whether or not there will be interference with movement of the shape data for the moving for each axis of movement direction for the two or more axes, and elects a movement direction with no interference, and the function generator section generates a function for moving the moving section in the elected movement direction.

DESCRIPTION OF THE PREFERRED EMBODIMENT

Embodiments of the present invention will be described in the following with reference to the drawings.

Figure 1:
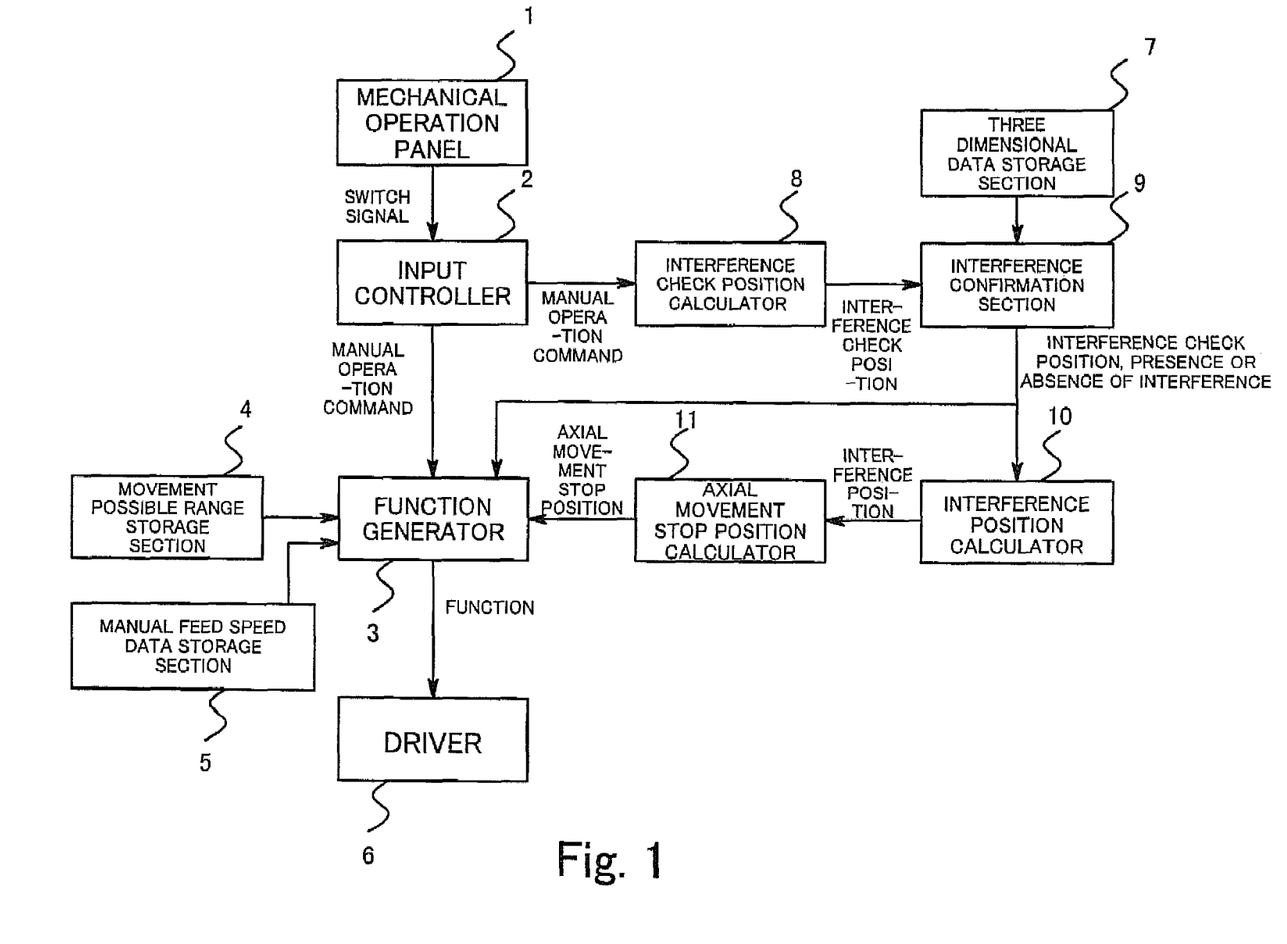
FIG. 1 is a block diagram showing one example of a numerical control device relating to a first embodiment of the present invention.

FIG. 1 is a block diagram showing one example of the structure of a numerical control unit of this embodiment, and this numerical control unit has a collision avoidance function in manual operation.

A mechanical operation panel 1 comprises a switch for selecting an axis for manual feed, and a switch for selecting a manual feed direction. Switch signals that have been input by these switch operations are sent to input controller 2. In the input controller 2, the switch signals are decoded, and data for manual feed axis and manual feed direction are generated and sent to function generator 3 as a manual operation command.

If the function generator 3 receives a manual operation command a function is generated for every axis control period in order to carry out axial movement control of a moving section of a machine tool. While a manual operation command is being received, this function generation is continuous, and once the manual operation signal is taken away a function for decelerating and stopping the moving section is generated, and control after stopping is completed. When calculating this function, manual feed velocity data that has been stored in advance is referenced and a function generation position is calculated to that the moving section is moved axially at a specified acceleration and speed.

Also, a set limit position is stored in possible movement range storage section 4, as a boundary of a range of possible movement for each control axis, and the function generator 3 generates a function so that the moving section is decelerated and stopped at the limit position in the event of a manual operation instruction that would cause the moving section to pass this limit position and move out of the movement possible range, and control is completed. The calculated function is sent to driver 6 for each axis control period, and the driver 6 drives the moving section of the machine tool based on the function.

Three dimensional data for items that might cause interference accompanying axial movement of the moving section of the machine tool, such as workpiece, jig, tool, machine tool elements etc., are registered and stored in three dimensional storage section 7. Among these three dimensional data items, the item that has a possibility of interfering with the moving section moved by a manual axial movement operation as a result of this movement varies depending on the configuration of the machine tool, and is not limited to the description above.

Interference check position calculator 8 receives a manual operation command from the input controller 2. The interference check position calculator 8 performs sequential calculation of a position that is, for example, a specified position from the current position of the moving section, as an interference check position, in accordance with a received manual feed axis and manual feed direction so that it is possible to confirm whether or not there is interference using three dimensional data of the moving section and three dimensional data for an interfering object.

Interference confirmation section 9 sequentially moves the three dimensional data for the moving section to this interference check position, performs a check to see if there is an overlap on three dimensional space of three dimensional data of the interfering object, and determines that there is interference if there is an overlap, or determines that there is no interference if there is no overlap. If it is determined that there is interference this time, interference position calculator 10 calculates a position where the moving section starts to interfere with the interfering object in a movement process from an interference check position, where it was determined the previous time that there was no interference, to an interference check position where it is determined this time that there is interference, as an interference position. By making the distance used by the interference check position calculator 8 when calculating the interference check position small, it also becomes possible to acquire an interference position directly from the interference check position where it is determined that there is interference this time.

Axial movement stop position calculator 11 calculates a position that is separated by only a predetermined distance from the interference position calculated by the interference position calculator 10 towards an interference check position where it has been determined that there is no interference previously, as an axial movement stop position where the moving section is decelerated and stopped before interference occurs. This predetermined distance can be appropriately determined depending on three dimensional data precision and the purpose of the numerical control unit, and can also be made data that the operator can create.

The function generator 3 is for generating a function for every axis control period in order to perform axial movement control of the moving section of the machine tool in accordance with a manual operation instruction, and more specific operation will be described in the following.

First of all, the function generator 3 generates a function after it has been confirmed that interference does not occur with movement of the moving section. As described, the interference confirmation section 9 has confirmed that there is no interference based on the interference check position, which section that this interference check position where it has been determined that there is no interference is constantly monitored, and by comparison with the current position of the moving section it is possible to commence function generation after waiting for a distance where safe movement is possible without causing interference to be ensured.

Also, during this function generation, if the interference confirmation section 9 determines at a particular point in time that there is interference, and the function generator 3 receives the axial movement stop position calculated by the axial movement stop position calculator 11, by means of the interference position calculator 10, the function generator 3 generates a function so as to decelerate and stop at this axial movement stop position, and control is completed. This makes it possible to start function generation at a point in time where a distance enabling safe movement without causing interference has been ensured by the function generator 3, as described, and also, by carrying out function generation while constantly monitoring the fact that a safe distance is being ensured, it is possible to decelerate and stop reliably at the obtained axial movement stop position. Deceleration and stopping at the axial movement stop position can be realized with the same method for deceleration and stopping at the limit position in which movement is possible, of the related art. Also, the distance at which safe movement is possible without causing interference is data that can be appropriately determined at the time of implementation of the present invention. For example, data used at the point in time that movement of the moving section commences is made a distance required to accelerate, decelerate and stop, and after commencing movement of the moving section is preferable a distance required to decelerate and stop from the movement speed of the moving section.

Also, as another operation of the function generator 3, it is possible, instead of waiting for a distance in which safe movement is possible without causing interference and then commencing function generation, it is also possible to commence function generation at the point in time where the interference confirmation section 9 determine that there is interference, and the axial movement stop position calculator 11 acquires a calculated axial movement stop position by means of the interference position calculation means 10. Specifically, function generation commences at the point in time where it has been confirmed to what position movement is possible in accordance with the manual feed axis and manual feed direction in a manual axial movement operation.

Also, when the moving section is decelerated and stopped, in a numerical control device in which it is not necessary to carry out function generation in order to decelerate and stop in the function generator 3, as described previously, it is possible to either commence function generation after confirming that a distance in which safe movement is possible without causing interference has been confirmed, or to generate a function using an interference check position where it is conformed that there is no successive interference, without the need to start function generation after confirming an axial movement stop position.

It is also possible for the function generating means 3 to both generate a function in order to cause the moving section to stop at the axial movement stop position, and to also complete the function generation of the related art so as to cause a stop at a limit position for which movement is possible. In this case, it is possible to give priority to axial movement stop position, give priority to the possible movement range of the prior art, or make it possible for the operator to perform a priority select operation.

Also, the description of this embodiment has been given for linear axes, but this is not limiting, and it is also possible for the moving section to rotate or to turn around a rotating shaft, and it is also applicable to rotation of a tool rest to which a tool is fitted in a lathe, or to rotation of tool replacement arm governing replacement of a tool fitted on a main shaft or a tool of a magazine pot in a machining center.

Figure 2:
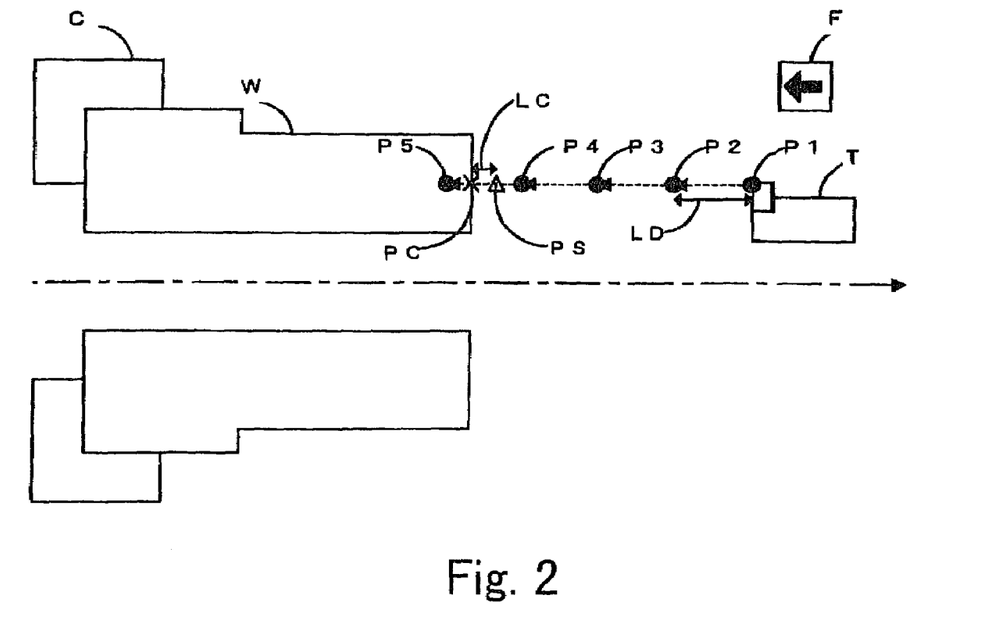
FIG. 2 is a drawing for describing a specific operation with a lathe relating to a first embodiment of the present invention.

Next, operation of the interference check position calculator 8, the interference confirmation section 9, the interference position calculator 10 and the axial movement stop position calculator 11 will be specifically described using FIG. 2. In FIG. 2, tool T represents three dimensional data of the moving section, while material W and chuck C represent three dimensional data for interference objects, that have a possibility of causing interference due to the fact that the Tool T moves.

Here, if a manual feed switch F is pressed down, the interference check position calculator 8 calculates an interference check position P2 from the current position P1 by adding a fixed distance LD. By repeating this operation, interference check positions P3, P4 . . . are also calculated. The interference confirmation section 9 acquires the sequential interference check positions P2, P3, P4 . . . , causes movement of the three dimensional data of the tool T, and confirms whether or not there is overlap of the three dimensional data for the material W and the chuck C on a three dimensional space. With respect to the interference check positions P2, P3, P4, as there is no overlap on the three dimensional space it is determined that there is no interference, but for the interference check position P5, as an overlap exists it is determined that there is interference.

The interference position calculator 10 calculates a position where the tool T starts to interfere with the material W, from a previous interference check position P4 where it was determined that there was no interference, and the interference check position P5 this time where it is determined that there is interference, as an interference position PC. The axial movement stop position calculator 11 calculates a position that is separated by only a predetermined distance LC from the interference position PC towards the previous interference check position P4 where it has been determined that there is no interference, as an axial movement stop position.

The function generator 3 operates in accordance with the interference check position calculated as described above, whether or not there is interference, and the axial movement stop position. Specifically, the function generating means 3 monitors the previous interference check positions P2, P3, P4 that were determined to have interference, generates a function, and if an axial movement stop position PS is acquired a function is generated so as to decelerate and stop at this axial movement stop position PS and control is terminated. In this case, it is also possible for the function generator 3 to commence generating the function after acquiring the axial movement stop position PS, generating the function so as to decelerate and stop at the axial movement stop position PS, and terminate control.

Also, if the specified distance LD is large, for example, if LD is four times the length shown in the drawing, the interference check position calculator 8 calculates an interference check position P5 from the current position P1 by adding the distance (LD×4). The interference confirmation section 9 determines that the tool T and the material W will have interference at the interference check position P5.

The interference position calculator 10 calculates a position where the tool T and the material W start to interfere, as an interference position PC, from the current position P1 and the interference check position P5 determined to have interference. The axial movement stop position calculator 11 calculates a position separated by only a desired distance LC from the interference position PC in a direction towards the current position P1, as an axial movement stop position PS.

If the function generator 3 acquires an axial movement stop position PS, function generation commences from the current position in an X axis minus direction instructed using a manual feed switch F, a function is generated so as to decelerate and stop at the axial movement stop position PS, and control is terminated.

Figure 3:
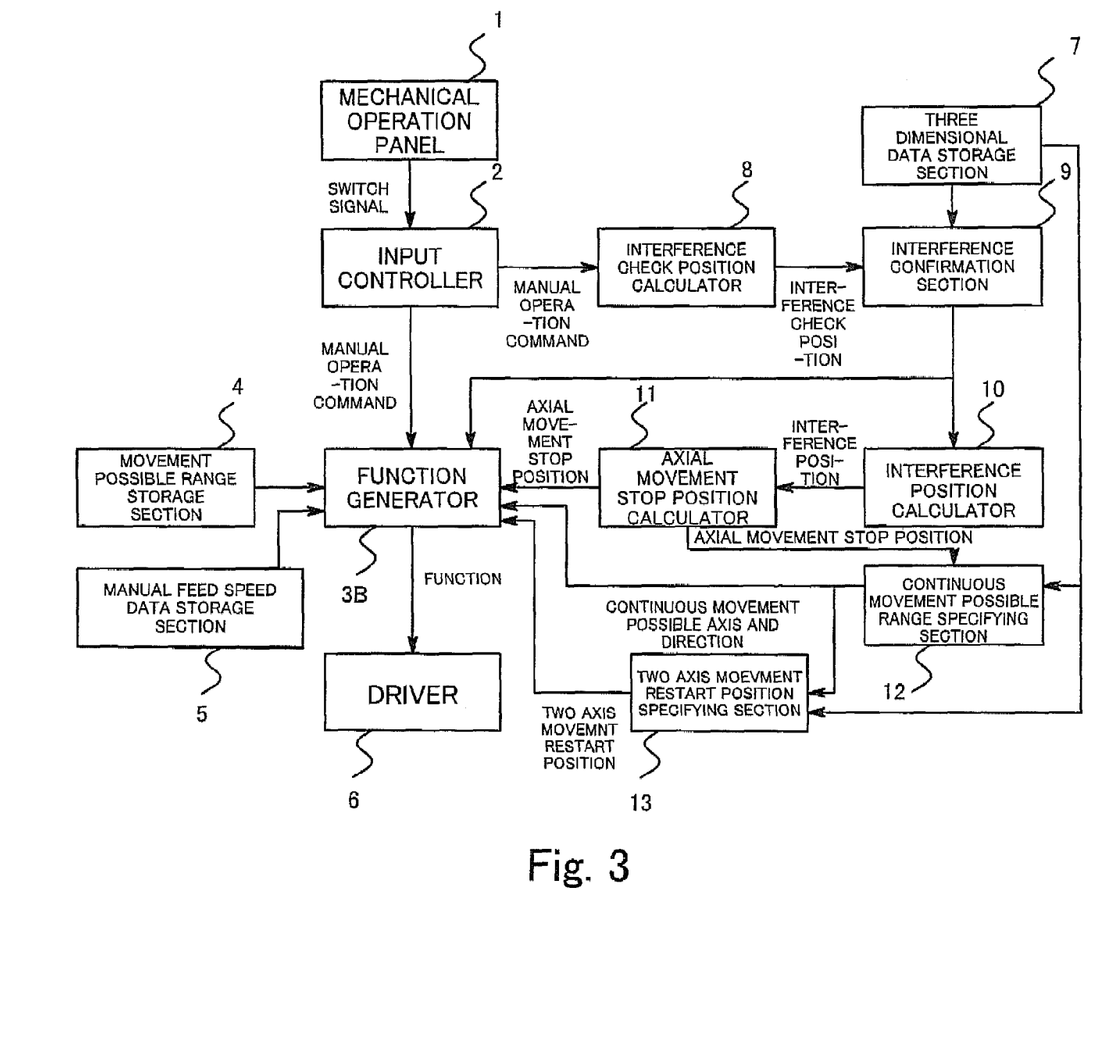
FIG. 3 is a block diagram showing one example of a numerical control device relating to a second embodiment of the present invention.

FIG. 3 is a block diagram showing one example of the structure of another numerical control unit of the present invention, and similarly to the device shown in FIG. 1, has a collision avoidance function at the time of manual operation. Structural aspects that are the same as FIG. 1 are assigned the same reference numerals, and their description will be omitted.

Figure 4:
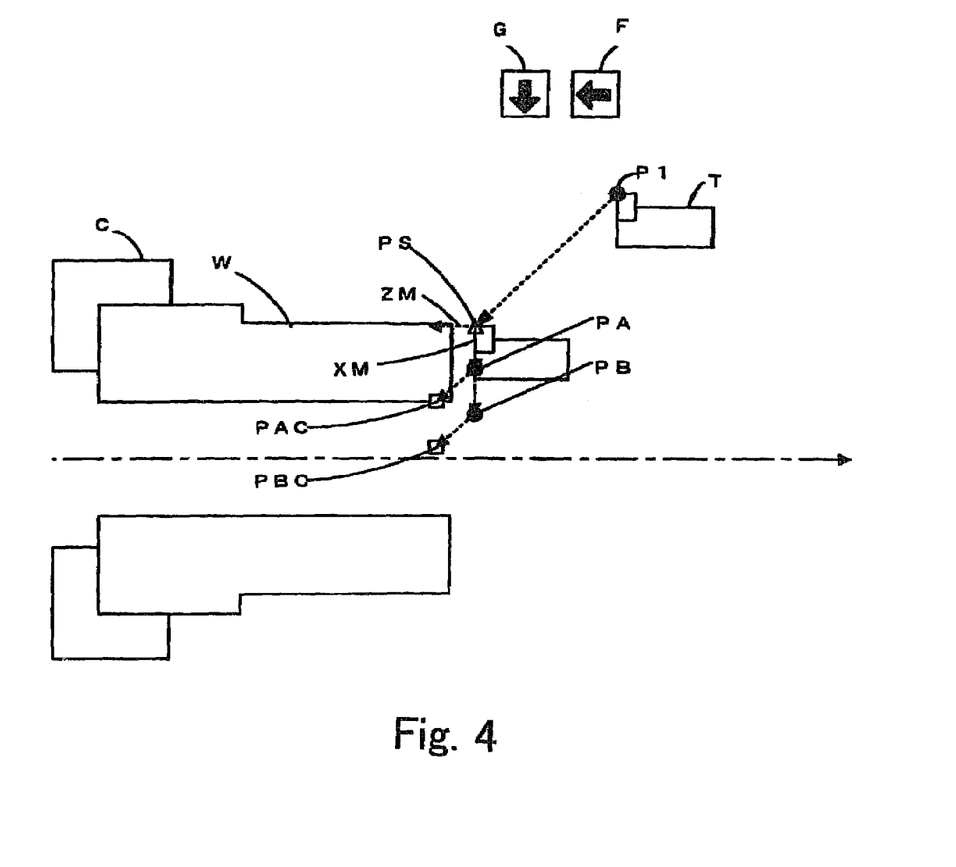
FIG. 4 is a drawing for describing specific operation with a lathe relating to a second embodiment of the present invention.

As shown in FIG. 4, if manual feed switches F and G are pressed down at the same time, the movement direction of the tool T becomes movement along two axes, and the axial movement stop position calculator 11 calculates an axial movement stop position PS while the function generator 3 causes the tool T, which is a moving section, to decelerate and stop at PS.

Here, the continuous movement possible axis specifying section 12 of FIG. 3 determines whether or not movement is continuously possible without interference, for the first of the two axes, and in the event that movement is continuously possible the axis and the movement direction for which movement is continuously possible are notified to the function generator 3 and the two axis movement reposition specifying section 13. Here, if continuous movement is not possible, it is similarly determined for the remaining one axis whether or not movement is continuously possible without interference, and in the event that movement is continuously possible the axis and the movement direction for which movement is continuously possible are notified to the function generator 3 and the two axis movement reposition specifying section 13.

As has already been described, whether or not continuous movement is possible without interference can be determined by causing the three dimensional data of the moving section to move along a desired axis and in a desired direction, and confirming whether or not the three dimensional data of an interfering object overlaps on a three dimensional space.

Referring to FIG. 4, if three dimensional data of the tool T is caused to move from the axial movement stop position PS in a Z axis minus direction ZM, it is possible to confirm that there is interference with three dimensional data of the material W, if three dimensional data of the tool T is caused to move in an X axis minus direction it can be determined that there is no interference, and an axis along which consecutive movement is possible and a movement direction become an X axis movement direction.

Figure 5:
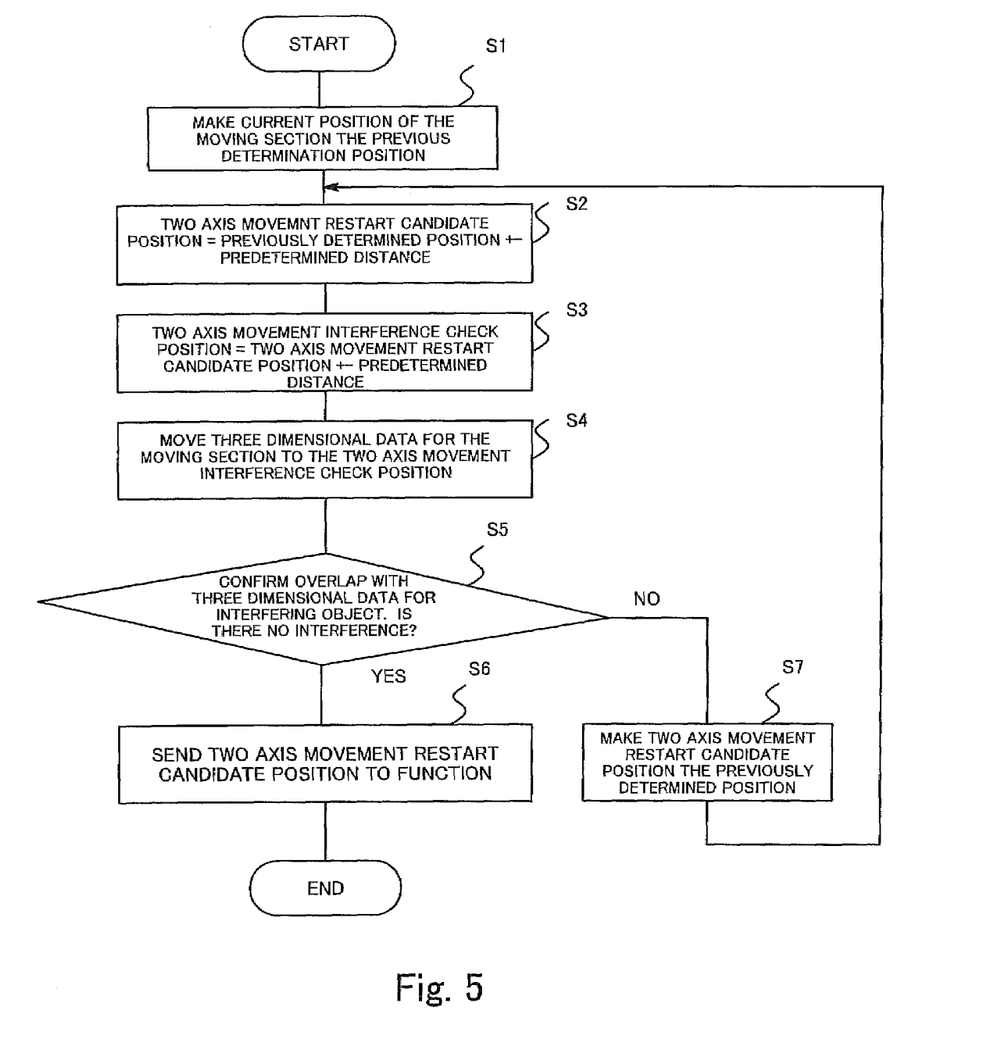
FIG. 5 is a flowchart showing one example of two-axis movement restart position specifying means of the second embodiment of the invention.

The two axis restart position specifying section 13 calculates a position where it is possible to restart two axis movement of the moving section in a step shown in the flowchart of FIG. 5.

S 1: make current position of the moving section the previous determination position.

S 2: for the previous determination position, calculate position where a specified distance is added to a movement direction of the axis in which continuous movement is possible as a two axis movement restart candidate position.

S 3: for the two axis movement restart candidate position, calculate a position obtained by adding a specified distance to a two axis movement direction designated by manual feed switches F and G as a two axis movement interference check position.

S 4: Move three dimensional data for the moving section to the two axis movement interference check position.

S 5: confirm whether or not there is overlap of the three-dimensional data for the moving section that has been moved and three dimensional data of an interference object on three dimensional space, and determined whether or not movement is possible along two axes without causing interference.

S 6: If there is no overlapping of the respective three dimensional data, there may be cases where movement is possible along two axes, and a two axis movement restart position candidate position calculated in S2 is supplied to the function generating means 3 as a two axis movement restart position, and control is terminated.

S 7: If there is overlapping of the respective three dimensional data, there may be cases where movement is not possible along two axes, and a two axis movement restart position candidate position calculated in S2 is made the previously determined position, and processing returns to step 2.

The two axis movement restart position that has been calculated by the two axis restart position specifying section 13 in step 2 described above is notified to the function generator 3.

Referring to FIG. 4, positions PA, PB specified distances sequentially added in an X axis minus direction from the axial movement stop position PS constitute the two axis movement restart candidate positions, and for PA and PB positions PAC, PBC that have specified distances added in two axis movement directions instructed by the manual feed switches F and G constitute two axis movement interference check positions. Here, three dimensional data of the tool, which is the moving section, is made to move to PAC, PBC, and if it is confirmed that there is overlap with three dimensional data if the material W, which is the interference object, since there is no overlap at PBC a two axis movement restart candidate position PB 2 corresponding to PBC becomes a two axis movement restart position, and this is notified to the function generating means.

After decelerating and stopping the tool T at PS, the function generator 3 commences generation of a one axis function to move the tool T in an X axis minus direction, which is a movement direction of an axis for which continuous movement is possible acquired from the continuous movement possible axis specifying section 12, generates a function so as to decelerate and stop at a two axis movement restart position PB acquired from the two axis movement restart position specifying section 13 and terminates control. After that, since a state where two axis movement is possible is entered, the function generator 3 carries out function generation to start movement of the moving section, move the moving section and decelerate and stop the moving section in accordance with an interference check position and an axial movement stop position.

Description of this embodiment has been given for a case where after the two axis movement restart position has been calculated the function generator 3 starts function generation for movement along one axis where movement is possible without causing interference, but it is also possible start function generation or one axis movement at a point in time where a distance for which safe movement is possible without interference has been confirmed without waiting for calculation of the two axis movement restart position, or alternatively, in the event that it is not necessary to carry out function generation for deceleration and stop, restart function generation at a point in time where an axis and movement direction that do not cause interference have been specified.

Also, description of this embodiment has been given for two axes, but it is also possible implement the same method with three or more axes. With this embodiment, description has been given with shape data of a moving object and of an interfering object as three-dimensional data, but it is also possible to express these shapes using two dimensional data, and to confirm whether or not there will be interference using two dimensional data.

What is claimed is:

1. A numerical control device for causing movement of a moving section of a machine tool, comprising:

an operation input device for performing movement operations for the moving section manually, wherein the operation input device comprises a manual movement command generated by operating a switch for selecting an axis for a manual feed and a switch for selecting a direction of the manual feed;

a memory for storing shape data of the moving section and shape data of an interfering object, that is capable of interfering with the moving section;

an interference check position calculation section for successfully calculating an interference check position separated from a present position of the moving section by a predetermined distance in a movement direction input using the operation input device; an interference check section for confirming, before generation of a function for moving the moving section to the interference check position, whether or not shape data of the moving section will interfere with shape data of the interfering object at the interference check position calculated by the interference check position calculation section, wherein, if it is confirmed that there will not be interference, interference check at a next interference check position calculated by the interference check position calculation section is repeatedly performed;

an axial movement stop position calculation section that, if it is confirmed by the interference check section that there will be interference, acquires an interference position at which the moving section will start interfering with the interfering object, and calculates a stop position separated only a predetermined distance from an the interference position in a direction opposite to the movement direction; and a function generator section for, in parallel to the interference check by the interference check section, controlling axial movement of the moving section to an interference position where it has been determined by the interference check section that there will be no interference, through function generation corresponding to the manual axial movement operation and, in the event that it has been determined by the interference check section that there will be interference, generating a function to stop the movement section at the stop position calculated by the axial movement stop position calculation section.

2. The numerical control device of claim 1, wherein:

when movement direction of a manual axial movement operation is two axes or more, the interference check section, in the event that it is determined that there will be interference between shape data of the moving section and shape data of the interfering object, confirms whether or not there will be interference by moving the shape data of the moving section, from the stop position, in respective movement directions of the two or more axes, simultaneously, and elects a movement direction with no interference, and the function generator section generates a function for moving the moving section in the elected movement direction.

* * * * *